United States Patent [19]

Heistand, II

[11] Patent Number: 4,808,398

[45] Date of Patent: Feb. 28, 1989

[54] NARROW SIZE DISTRIBUTION ZINC OXIDE

[75] Inventor: Robert H. Heistand, II, E. Walpole, Mass.

[73] Assignee: The Dow Chemical Company, Midland, Mich.

[21] Appl. No.: 701,472

[22] Filed: Feb. 14, 1985

[51] Int. Cl.$^4$ .............................................. C01G 9/02
[52] U.S. Cl. ................................................... 423/622
[58] Field of Search ............... 423/101, 102, 622, 623, 423/DIG. 9; 568/852, 902 R, 911

[56] References Cited

U.S. PATENT DOCUMENTS

| | | | |
|---|---|---|---|
| 1,522,097 | 1/1925 | Dreyer et al. | 423/623 |
| 2,154,603 | 4/1939 | Bley | 423/629 |
| 2,603,554 | 7/1952 | Calbeck | 423/622 |
| 2,776,188 | 1/1957 | Gilbert | 502/342 |
| 2,844,436 | 7/1958 | Baker et al. | 423/305 |
| 2,917,366 | 12/1959 | Hansford | 568/852 |
| 3,016,397 | 1/1962 | Walde | 556/185 |
| 3,255,257 | 6/1966 | Brindell et al. | 568/840 |
| 3,406,228 | 10/1968 | Hardy et al. | 264/0.5 |
| 3,453,072 | 7/1969 | Vian-Ortuno et al. | 423/104 |
| 3,664,866 | 5/1972 | Manasevit | 428/700 |
| 3,711,305 | 1/1973 | Anderson | 106/33 |
| 4,193,769 | 3/1980 | Cheng et al. | 423/622 |
| 4,397,773 | 8/1983 | May | 252/518 |
| 4,436,650 | 3/1984 | Bowen | 338/21 |
| 4,463,268 | 7/1984 | Levinson | 307/106 |
| 4,473,812 | 9/1984 | Maruyama et al. | 338/21 |
| 4,475,091 | 10/1984 | Itakura et al. | 333/17 L |
| 4,543,341 | 9/1985 | Barringer et al. | 423/622 |

OTHER PUBLICATIONS

Encyclopedia of Chemical Reactions, ed., by Jacobson et al., Reinhold Publishing Co., 1959, pp. 185, 191; vol. VIII.

Handbook of Separation Techniques for Chemical Engineers, Ed., by Schweitzer, McGraw-Hill Book Co., 1979, p. 6-4.

"Chemical Preparation and Properties of High-Field Zinc Oxide Variators", Dosch et al., J. Mater. Res., 1(1), Jan./Feb. 1986, pp. 90-99.

Zinc Oxide Surface Coating Development; Quarterly Report No. 6, pp. 1-7, MIT, Apr. 9, 1984.

Comprehensive Organometallic Chemistry, vol. 2, Ed., by Wilkinson et al., Pergamon Press, 1982, pp. 834; 837-840.

V. A. Dodonov et al., "Reaction of Ethyl(Triphenylmethoxy)- and Ethyl(Triphenylsilioxy)-Zincs and Cadmiums with Ethylene Oxide", Journal of General Chemistry of USSR, 50, No. 2, 287-291, (1980).

Zinc Chemicals, M. Fransworth and C. H. Kline, pp. 47-50, Zinc Institute, Inc., N.Y., N.Y., (1983).

Derwent 90981C.
Derwent 10476K.
Derwent 91172E.
Chemical Abstracts, 98:37002b.
Chemical Abstracts, 100:36391a.
Derwent 40021K.

Fegley et al., Communications of the American Ceramic Society, (Jun. 1984), pp. C-113–C-116.

B. Fegley and E. A. Barringer, "Synthesis, Characterization, and Processing of Monosized Ceramic Powders"; Better Ceramics Through Chemistry, edited by C. J. Brinker, Elsevier, N.Y., (1984).

Nishizawa, H. et al., J. Am. Cer. Soc., (Communications), vol. 67, pp. C-98–100, (1984).

Fegley, B. and Barringer, E. A. in Ceramics Processing Research Laboratory Report No. 36, Mass. Inst. of Technology, (1984).

Fegley, et al., Ceramic Bulletin, vol. 63, No. 8, p. 996, (1984), "ZnO Quarterly Report", (1984).

Christine Sobon, Aug. 21, 1984, Zinc Oxide Report, "Preparation of ZnO by the Pyrolysis of Zn(OMe)$_2$".

Matsui, Y. et al., Bull. Chem. Soc. Japan, vol. 39, p. 1828, (1966), J. Chem. Soc.(B), pp. 799–803, (1966); Id. at pp. 1020–1024.

Shearer, H. M. M. and Spencer, C. B.; Chemical Communications, p. 194, (1966).

MIT Ceramics Processing Research Laboratory, Report Q1, (1984), by C. Sobon.

"Zinc Oxide Research", Summary by Dr. B. Fegley, (1984).

"Synthesis and Characterization of ZnO-Based Power", author unknown.

"Coating of Commercial ZnO Powder", Zinc Oxide Report, 8-21-1984.

Primary Examiner—John Doll
Assistant Examiner—Jeffrey Edwin Russel
Attorney, Agent, or Firm—M. F. Zuckerman; P. D. Hayhurst

[57] ABSTRACT

Prepare highly pure zinc oxide spherodial particles of narrow size distribution and having a mean particle diameter of from about 0.1 to about 0.3 $\mu$m by hydrolyzing hydrocarbyl zinc hydrocarboxides, such as ethyl zinc t-butoxide.

10 Claims, No Drawings

NARROW SIZE DISTRIBUTION ZINC OXIDE

BACKGROUND OF THE INVENTION

The present invention relates to metal oxide particles and their preparation. More specifically, it relates to the production of zinc oxide.

Zinc oxide is a well-known compound and has several well-known utilities. It is especially useful in the production of electronic components such as varistors. See, e.g., U.S. Pat. Nos. 4,460,623; 4,320,379; 4,243,622; 4,285,839; and 4,374,049. The availbility of spheroidal zinc oxide of submicron, uniform particle size is important in the preparation of varistors. The non-linearity of the varistor device arises from a thin, insulating secondary phase grain boundary. The smaller the grain size of the zinc oxide, the more grain boundaries per unit volume. Thus, smaller grains allow the production of varistors having higher voltage ratings per unit volume. The more uniform the microstructure, the sharper the break from linear to non-linear behavior. See, e.g., *Ceramic Bulletin*, Vol. 63, p. 278 at p. 280; Lauf, R. J. and Bond W. D. (1984). However, current technology is incapable of producing zinc oxide of submicron, uniform particle size.

A conventional method of producing zinc oxide involves burning zinc metal vapors. See, e.g., *Zinc Chemicals*, by M. Farnsworth and C. H. Kline, pp. 47–50; Zinc Institute, Inc., NY, NY (1983). However, this method has relatively poor control over product particle size. Similarly, other proposed methods have not been proven successful in the preparation of spheroidal zinc oxide of submicron particle size and relatively uniform particle size distribution. In view of the lack of success of prior art methods and the deficiencies inherent therein, and in view of the need for spheroidal zinc oxide of submicron particle size and uniform size distribution, it would be desirable to have a process which could prepare the desired zinc particles.

SUMMARY OF THE INVENTION

The present invention is a composition comprising spheroidal zinc oxide particles of narrow size distribution, the particles being of from about 0.1 to about 0.3 μm in mean diameter and having a standard deviation of less than about 30 percent of the mean particle size, and a process for the preparation thereof. The process comprises contacting a hydrocarbyl zinc hydocarboxide with water in the presence of a reaction medium under reaction conditions such that there are formed zinc oxide particles having a mean diameter of from about 0.1 to about 0.3 μm and a standard deviation of less than about 30 percent of the mean particle size. Surprisingly, the process produces spheroidal particles having an unexpectedly uniform particle size distribution, and can be employed in the preparation of high purity or specifically doped zinc oxide products having said characteristics. The zinc oxide product is especially useful in the preparation of ceramic articles and electronic components, such as varistors, and is useful in other known applications for zinc oxide.

DETAILED DESCRIPTION OF THE INVENTION

As used herein, the term "submicron" refers to dimensions of from about 0.05 μm up to less than 1 μm.

A hydrocarbyl zinc hydrocarboxide advantageously is employed in the process of the present invention. For the purposes of the present invention, the term "hydrocarbyl" includes hydrocarbon moieties having from about 1 to about 30 carbon atoms including moieties such as alkyl, aryl, alkaryl, aralkyl, cycloalkyl, alkenyl, aralkenyl, cycloalkenyl, and the like, including straight- or branched-chain moieties. Similarly, the term "hydrocarboxide" refers to a hydrocarbyl moiety which is bonded to a zinc atom through a common oxygen atom. As used herein, the terms "hydrocarbyl" and "hydrocarboxide" include such moieties which are inertly substituted, i.e., which bear substituent atoms or moieties which do not prevent the formation of the desired zinc oxide product. Examples of typical hydrocarbyl zinc hydrocarboxides include compounds such as ethyl zinc t-butoxide, phenyl zinc t-butoxide, methyl zinc methoxide, naphthyl zinc t-butoxide, benzyl zinc butoxide, ethyl zinc phenoxide, ethyl zinc 2-methoxy ethoxide, methyl zinc dodecoxide and the like. Preferred hydrocarbyl zinc hydrocarboxides are represented generally by the formula

R-Zn-OX wherein R and X independently are hydrocarbyl moieties of up to 30 carbons each, with the proviso that R is unsubstituted and X consists of C, H and, optionally, O atoms. For example, the X moiety can be a polyglycol ether moiety. Preferably, R and X are independently alkyl or aryl. More preferably, R and X are independently alkyl. Most preferably, R and X are independently alkyl of up to about 12 carbon atoms. Examples of preferred hydrocarbyl zinc hydrocarboxides include ethyl zinc t-butoxide, ethyl zinc isopropoxide, ethyl zinc methoxide, and methyl zinc methoxide. Ethyl zinc t-butoxide is the most preferred hydrocarbyl zinc hydrocarboxide.

A hydrolyzing agent is advantageously employed in the process of the present invention. The hydrolyzing agent is employed in an amount which is sufficient to cleave all organic moieties from the hydrocarbyl zinc hydrocarboxide such that zinc oxide is formed. Typically, from about 1 to about 20 moles of the hydrolyzing agent are employed per mole of hydrocarbyl zinc hydrocarboxide. Preferably, from about 4 to about 10 moles of the hydrolyzing agent are employed per mole of hydrocarbyl zinc hydrocarboxide. Water is the preferred hydrolyzing agent.

A reaction medium advantageously is employed in the process. The reaction medium functions to solubilize the reactants, at least partially, to disperse the products, to transfer heat and to control concentrations. The reaction medium is employed in any amount sufficient to allow production of the zinc oxide of the present invention. Typically, from about 2 to about 1000 ml of reaction medium are employed per gram of hydrocarbyl zinc hydrocarboxide. Preferably, from about 15 to about 60 ml of reaction medium are employed per gram of hydrocarbyl zinc hydrocarboxide. Most preferably, from about 25 to about 35 ml of reaction medium are employed per gram of hydrocarbyl zinc hydrocarboxide. Examples of typical reaction media include hydrocarbons, such as toluene, naphtha and hexane; hydroxyl-containing compounds such as ethanol, methanol, isopropanol, and the polyglycol ethers; and the like, and mixtures thereof. Examples of preferred reaction media include toluene, ethanol, and mixtures thereof.

The process of the present invention can be performed under any combination o temperature and pressure at which the desired product can be produced. Typically, the pressure employed ranges between from about 1 and about 400 KPa, with pressures from about 80 to about 150 KPa being preferred. The contacting temperature typically is from about 0° C. to about 110° C., and preferably is from about 20° C. to about 30° C., with ambient temperature being most preferred for the sake of convenience. The process can be conducted over widely varying time periods, but typically is performed in a period of from about 1 to about 10 hours.

In a preferred embodiment of the present process, at least one hydrocarbyl zinc hydrocarboxide is dissolved in a reaction medium, such as anhydrous toluene, under an inert atmosphere. The solution is filtered to remove particulates down to submicron size, is rapidly contacted with a solution of water in a second reaction medium, and is stirred for 4 hours. Zinc oxide precipitates during the 4-hour period.

When the process of the present invention is performed in the manner described herein there are produced zinc oxide polycrystalline spheroidal particles of from about 0.1 to about 0.3 $\mu$m in mean diameter, and having a standard deviation of less than about 30 percent of the mean particle diameter. Preferably, the standard deviation is less than about 25 percent, and most preferably is less than about 20 percent of the mean particle diameter. The preferred mean particle size is from about 0.15 to about 0.2 $\mu$m. The particles prepared using the process of the present invention can be free from alkali metals, nitrates, sulfates, and chlorides, which are contained in precursors used in some typical prior art methods for the preparation of zinc oxide. As mentioned hereinabove, these properties make the spheroidal particles of the present invention especially advantageous for use in the preparation of ceramic articles, such as varistors, which advantageously employ small particles of relatively uniform particle size. Additionally, the particles can be prepared using known dopants, thus making the particles desirable as precursors to varistors.

SPECIFIC EMBODIMENTS

The following examples are given to illustrate the invention and its advantage and should not be construed as limiting its scope.

EXAMPLE 1

In an inert atmosphere of nitrogen, 3.252 g of ethyl zinc t-butoxide is dissolved in 30 ml of anhydrous toluene. The solution is filtered and admixed quickly with a solution of 3 ml of deionized water and 67 ml of anhydrous ethanol. Stirring is maintained for 4 hours. Einc oxide is formed quantitatively and is collected by centrifugation. The zinc oxide is redispersed ultrasonically in absolute ethanol, and is recollected by centrifugation. The latter steps are repeated once. The centrifugate is finally dispersed ultrasonically in absolute ethanol producing a dispersion of 0.17–0.20 $\mu$m spheroidal white zinc oxide particles as characterized by scanning and transmission electron microscopy, Stokes settling, and photon correlation spectroscopy. The size distribution is characterized by a standard deviation of less than 20 percent of the mean diameter value. X-ray powder diffraction and dark field transmission electron microscopy reveal a polycrystalline structure.

EXAMPLE 2

In an inert atmosphere of nitrogen, 2.40 g of diethyl zinc gas are dissolved in 30 ml of anhydrous toluene. This is further, reacted with 1.44 g of anhydrous t-butyl alcohol. The resulting solution is iiltered and admixed quickly with the solution of water and anhydrous ethanol of Example 1. Then, the remainder of the procedure of Example 1 is repeated, starting with the 4-hour stirring, to produce a product similar to the product of Example 1.

What is claimed is:

1. A process for the preparation of ZnO spheroidal particles of narrow siz distribution, the process comprising contacting a hydrocarbyl zinc hydrocarboxide, wherein the hydrocarboxide moiety is a polyglycol ether moiety, with water in the presence of a reaction medium under reaction conditions such that there are formed zinc oxide particles having a mean diameter of from about 0.1 to about 0.3 $\mu$m and a standard deviation of less than about 30 percent of the mean particle size.

2. The process of claim 1 wherein the reaction medium comprises at least one of a hydrocarbon or a hydroxyl-bearing compound.

3. The process of claim 1 wherein the molar ratio of water to hydroxcarbyl zinc hydrocarboxide is from about 1 to about 20.

4. The process of claim 1 wherein the hydrocarbyl zinc hydrocarboxide is represented generally by the formula R-Zn-OX, wherein R is alkyl or aryl and OX is the polyglycol ether moiety.

5. The process of claim 1 wherein the contacting temperature is from about 0° C. to about 110° C.

6. The process of claim 4 wherein R is alkyl.

7. The process of claim 6 wherein R is alkyl of from about 1 to about 30 carbon atoms.

8. The rpocess of claim 7 wherein R is alkyl of up to about 2 carbon atoms.

9. A process for the preparation of ZnO spheroidal particles of narrow size distribution comprising:
   (a) dissolving at least one hydrocarbyl zinc hydrocarboxide, wherein the hydrocarboxide moiety is a polyglycol ether moiety, in a reaction medium to form a first solution;
   (b) filtering said first solution to remove particulates down to submicron size;
   (c) contacting said filtered solution with a second solution comprising water and a second reaction medium, the molar ratio of water to hydrocarbyl zinc hydrocarboxide ranging from about 1 to 20;
   (d) stirring said contacted first and second solutions until there are formed zinc oxide particles having a mean diameter of from aobut 0.1 to 0.3 $\mu$m and a standard deviation of less than about 30 percent of the mean particle size.

10. A process of claim 9, which is carried out udner an inert gas atmosphere.

* * * * *